United States Patent
Budd et al.

(10) Patent No.: US 12,434,268 B2
(45) Date of Patent: Oct. 7, 2025

(54) AUTOMATED SORTING METHOD FOR CIRCUIT BOARD RECYCLING

(71) Applicant: Integrated Recycling Technologies, St. Cloud, MN (US)

(72) Inventors: Steve Budd, Annandale, MN (US); Scott Schoen, Augusta, MN (US)

(73) Assignee: Integrated Recycling Technologies, St. Cloud, MN (US)

( * ) Notice: Subject to any disclaimer, the term of this patent is extended or adjusted under 35 U.S.C. 154(b) by 0 days.

(21) Appl. No.: 18/340,622

(22) Filed: Jun. 23, 2023

(65) Prior Publication Data
US 2023/0415201 A1 Dec. 28, 2023

Related U.S. Application Data

(60) Provisional application No. 63/366,969, filed on Jun. 24, 2022.

(51) Int. Cl.
*B07C 5/342* (2006.01)
*B09B 5/00* (2006.01)
(Continued)

(52) U.S. Cl.
CPC ............. *B07C 5/3422* (2013.01); *B09B 5/00* (2013.01); *G06T 7/0006* (2013.01); *G06T 7/001* (2013.01);
(Continued)

(58) Field of Classification Search
CPC ............... B07C 5/3422; B07C 5/342; B07C 2501/0054; B09B 5/00; B09B 2101/17;
(Continued)

(56) References Cited

U.S. PATENT DOCUMENTS

| | | | | |
|---|---|---|---|---|
| 5,774,573 A | * | 6/1998 | Caspi | G06T 3/403 382/141 |
| 2017/0120301 A1 | * | 5/2017 | Wang | B07C 5/16 |

(Continued)

FOREIGN PATENT DOCUMENTS

| | | | | |
|---|---|---|---|---|
| CN | 111715666 A | * | 9/2020 | B09B 3/00 |
| CN | 112060065 A | * | 12/2020 | |

(Continued)

OTHER PUBLICATIONS

Maria Grazia Bonelli, Lead collection after automatic components removal from printed circuit boards as a "novel" process for noble metals recovery from WEEE (Year: 2019).*
(Continued)

*Primary Examiner* — Gene O Crawford
*Assistant Examiner* — Muhammad Awais
(74) *Attorney, Agent, or Firm* — Lathrop GPM LLP; Tucker Griffith

(57) ABSTRACT

An automated method for sorting circuit boards for recycling is described. The method includes scanning a layout design for a circuit board and comparing the scanned layout design with a database of circuit board layout designs. Each of the layout designs being associated with a respective precious metal content value. A match between the scanned layout design and one of the circuit board layout designs in the database is identified. The method then assigns a precious metal designation to the scanned circuit board based on the identified match. The precious metal designation corresponds to the precious metal content value associated with the matched circuit board layout from the database. The method also includes sorting the scanned circuit board into a group associated with the assigned precious metal designation.

20 Claims, 6 Drawing Sheets

(51) Int. Cl.
*G06T 7/00* (2017.01)
*B09B 101/17* (2022.01)

(52) U.S. Cl.
CPC ... *B07C 2501/0054* (2013.01); *B09B 2101/17* (2022.01); *G06T 2207/30136* (2013.01); *G06T 2207/30141* (2013.01)

(58) Field of Classification Search
CPC .................. G06T 7/0006; G06T 7/001; G06T 2207/30136; G06T 2207/30141
USPC ........................................................ 209/577
See application file for complete search history.

(56) References Cited

U.S. PATENT DOCUMENTS

2021/0107034 A1* 4/2021 Aoki ..................... B07C 5/344
2022/0005170 A1* 1/2022 Yen ........................ G06T 7/001

FOREIGN PATENT DOCUMENTS

| CN | 114184619 A | * | 3/2022 | |
|---|---|---|---|---|
| CN | 111570327 B | * | 5/2022 | ............. B07C 5/342 |
| WO | WO-2020203910 A1 | * | 10/2020 | ............. B02C 23/20 |
| WO | WO-2021028618 A1 | * | 2/2021 | ......... H05K 13/0486 |

OTHER PUBLICATIONS

PCT Application No. PCT/US23/69023, International Search Report and Written Opinion dated Oct. 27, 2023.

Bonelli et al., Lead Collection After Automatic Components Removal from Printed Circuit Boards as a "Novel" Process for Noble metals Recovery from WEEE, IOP Conference Series: Earth and Environmental Science, 2019, (online), [retrieved on Sep. 22, 2023].

\* cited by examiner

AUTOMATED SORTING METHOD FOR CIRCUIT BOARD RECYCLING

STATEMENT OF RELATED INVENTIONS

This application is a U.S. Nonprovisional application which claims the benefit of U.S. Provisional Application No. 63/366,969, filed Jun. 24, 2022, and is hereby incorporated by reference in its entirety.

FIELD OF THE INVENTION

The present invention generally relates to a method and system for sorting circuit boards for recycling purposes, and more particularly relates to an automated method and system for sorting circuit boards based on factors, such as design, layout, size, weight, composition, precious metal content and the like with reference to a database where such factors are assessed and boards are aggregated for expedited and efficient sorting.

BACKGROUND

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

With the increased use of and reliance on electronic devices, there are more electronic devices needing to be disposed. Such devices include circuit boards that require special treatment when being disposed of. Moreover, such circuit boards commonly include valuable precious metals, and recycling and recovering such precious metals has become a profitable business. In general, disposed circuit boards are sent to plants for destruction, where precious metals are extracted and the remaining components are ground, shredded or otherwise destroyed for disposal.

Circuit boards are purchased according to the precious metal content in the boards per metric ton. Precious metals include gold, silver, palladium and base metal copper. After the boards are purchased, they are sorted, categorized and then shred to a 30 mm sized fraction and sent to the smelter for sampling and assaying to determine precious metal content. After the boards have been sorted and process, a buyer will commonly purchase the processed materials for the precious metals.

Precious metal content is determined by a fire assay process. Once precious metal content is known, individual boards can be sorted into similar categories and shred. Shredding circuit boards in like categories with similar precious metal loadings yields better results when sampled at a smelter.

When dealing in the aggregate regarding circuit board disposal and recycling, it is desirable to sort circuit boards based on precious metal content, or at least like design (e.g., all boards that have identical design or at least look the same are grouped together for processing). However, such facilities typically handle extraordinarily large quantities of circuit boards and sorting individual boards one-by-one is neither time efficient nor cost effective. For example, such facilities commonly handle over 1 million pounds of circuit boards per month. In this regard, what is needed is a more efficient method for sorting circuit board based on factors, such as design, size, weight, composition, precious metal content and the like where the circuit boards are grouped based on such factors in an expedited and efficient manner.

Presently, circuit board sorting is all done by hand. That is, workers are positioned on an assembly line where discarded circuit boards are on a conveyor belt and each worker looks at the boards and decides how to sort them strictly based on appearance. This approach is heavily dependent on each worker's ability to accurately recognize the design of the circuit boards in order to properly sort them based on precious metal content. However, such a system is greatly affected by human operator error. There are thousands of different circuit board designs—a human worker cannot possibly remember and accurately recognize each and every design, especially as boards are moving quickly along a conveyor belt. Additionally, a human cannot fully gauge precious metal content of a circuit board strictly based on sight and memory alone. Even if the worker can accurately recognize a board's design, one can easily mistakenly place the board in the wrong pile anyway. It is hard enough to find employees but finding someone that wishes to learn all the categories and codes required to be accurate is near impossible and requires another quality control employee that looks at every box before it is shredded to ensure quality. Thus, the current approach for sorting circuit boards is highly inefficient. Moreover, there is currently no automated system in the world that sorts circuit boards according to precious metal content.

If the efficiency of the sorting process can be improved, circuit board recycling can be lucrative given the sheer volume of circuit boards needing disposal. To date, however, there have been barriers to entry. Many companies, including Sims Metal Management, one of the largest electronics recycling companies in the world, along with others, have tried to enter the market of purchasing boards on an outright cash basis from other dismantlers and recyclers and have lost millions of dollars or gone bankrupt. In Sims' case, they closed that division and pivoted to another form of recycling. The reason has simply been because of the inefficiencies noted above. When the sorting of boards is not accurate, the full benefit of the precious metal recovery is not appreciated. A proven system to sort boards without sampling would open options for cash buying of boards all over the world.

In general, there is a need for an automated sorting method and system for recycling circuit boards that can efficiently sort such boards based on common factors, such as design, layout, size, weight, composition, and most desirably precious metal content. Accordingly, it is a general object of the present invention to provide a method and system for sorting circuit boards with reference to a database where relevant factors are assessed and boards are automatically and precisely aggregated for expedited and efficient sorting that overcomes the problems, drawbacks and limitations associated with prior art approaches while significantly improving the accuracy with which such boards are sorted.

SUMMARY

The below summary is merely representative and non-limiting.

The above problems are overcome, and other advantages may be realized, by the use of the embodiments. Various embodiments of the present invention address the issues, and provide means to circumvent the associated drawbacks of manual sorting practices. In particular, such embodiments can rely on a database of thousands of circuit board designs, layouts, and compositions, for which precious metal content and amounts can be accurately designated. In the sorting process, a board can be scanned, compared with the database, matched with a known design based on comparisons of designated factors, and sorted accordingly. If a board does not match any known design in the database, the individual board can be assayed and added to the database to improve the system's accuracy going forward.

In a first aspect, an embodiment provides an automated method for sorting circuit boards for recycling. The method includes scanning a layout design for a circuit board and comparing the scanned layout design with a database of circuit board layout designs. Each of the layout designs being associated with a respective precious metal content value. A match between the scanned layout design and one of the circuit board layout designs in the database is identified. The method then assigns a precious metal designation to the scanned circuit board based on the identified match. The precious metal designation corresponds to the precious metal content value associated with the matched circuit board layout from the database. The method also includes sorting the scanned circuit board into a group associated with the assigned precious metal designation.

In another aspect, an embodiment provides an automated device for sorting circuit boards for recycling. The automated device includes at least one camera configured to scan layout designs of circuit boards and at least one conveyer configured to move the circuit boards. The automated device may also include a processor; and a memory storing computer program code. The memory and the computer program code configured to, with the processor, cause the automated device to scan, using the camera, a layout design for a circuit board; to compare the scanned layout design with a database of circuit board layout designs, each of the layout designs being associated with a respective precious metal content value; and to determine whether a match between the scanned layout design and one of the circuit board layout designs in the database exist. In response to identifying a match, the automated device assigns a precious metal designation to the scanned circuit board based on the identified match. The precious metal designation corresponds to the precious metal content value associated with the matched circuit board layout from the database. The automated device also sorts the scanned circuit board into a group associated with the assigned precious metal designation; and moves, using the conveyor, the scanned circuit board into a location assigned to the group.

BRIEF DESCRIPTION OF THE DRAWINGS

Aspects of the described embodiments are more evident in the following description, when read in conjunction with the attached Figures.

DETAILED DESCRIPTION

In accordance with various embodiments of the present invention, a method and system for sorting circuit boards for recycling is provided. The method and system sorts circuit boards by identical or similar design, composition and/or precious metal content based on similarities of designated factors. More particularly, the sorting process involves a comparison of each circuit board with a database of circuit board designs, layouts and contents to identify how such boards should be grouped for further processing. The database comprises information about every board that is reviewed, with new designs, layouts and contents being added to the database as they are identified.

The database may be programmable. Information from a sorting lab can be used for continuous updates. As each board is scanned, the system can identify what type of board it is, map the layout and composition of the board, determine the precious metal content, and enter the precious metal content into the database at the time of scanning.

Figure 1:
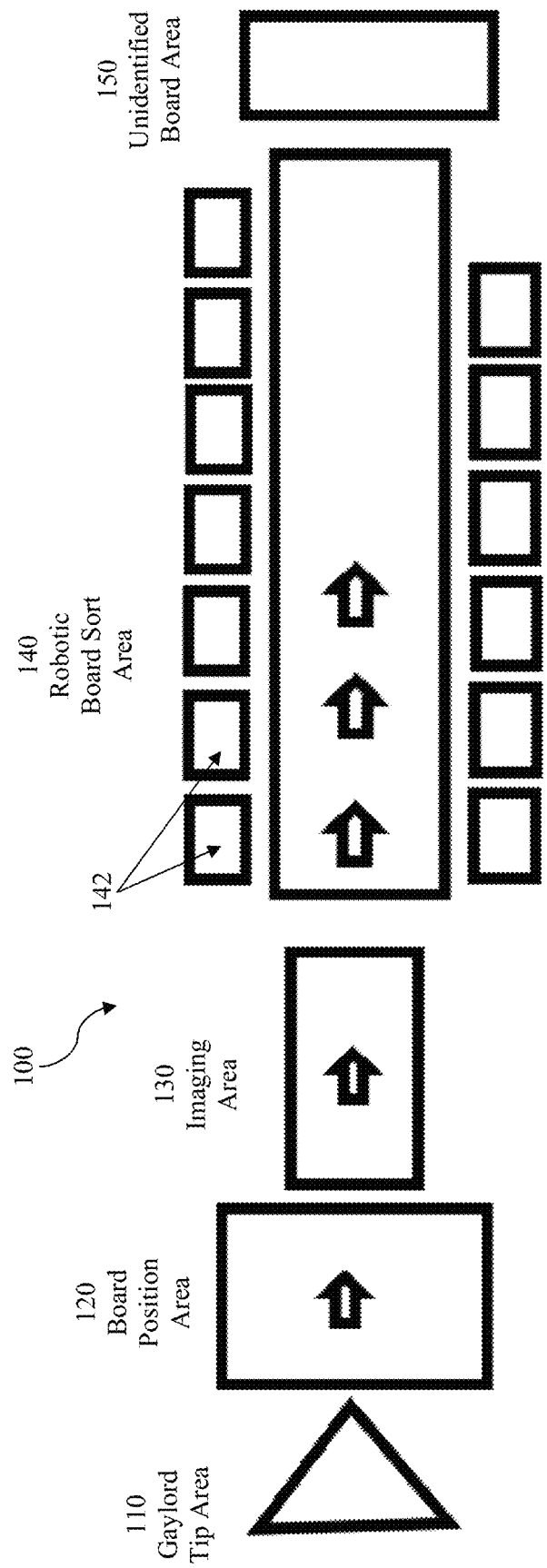
FIG. 1 shows a sorting process in accordance with an embodiment.

A schematic 100 of a sorting process in accordance with an embodiment is illustrated in FIG. 1. In general, each board is scanned, and the image is compared with images of boards in the database. Boards are received in a gaylord tip area 110. Then, the boards are moved to the board position area 120 and advanced to the imaging area 130. In the imaging area 130, the boards are scanned, and an identification is attempted. Boards that are identified can be sorted by the robotic board sort area 140 into associated bins/boxes 142. Boards that are not recognized are sent to the unidentified board area 150 for analysis.

Figure 2:
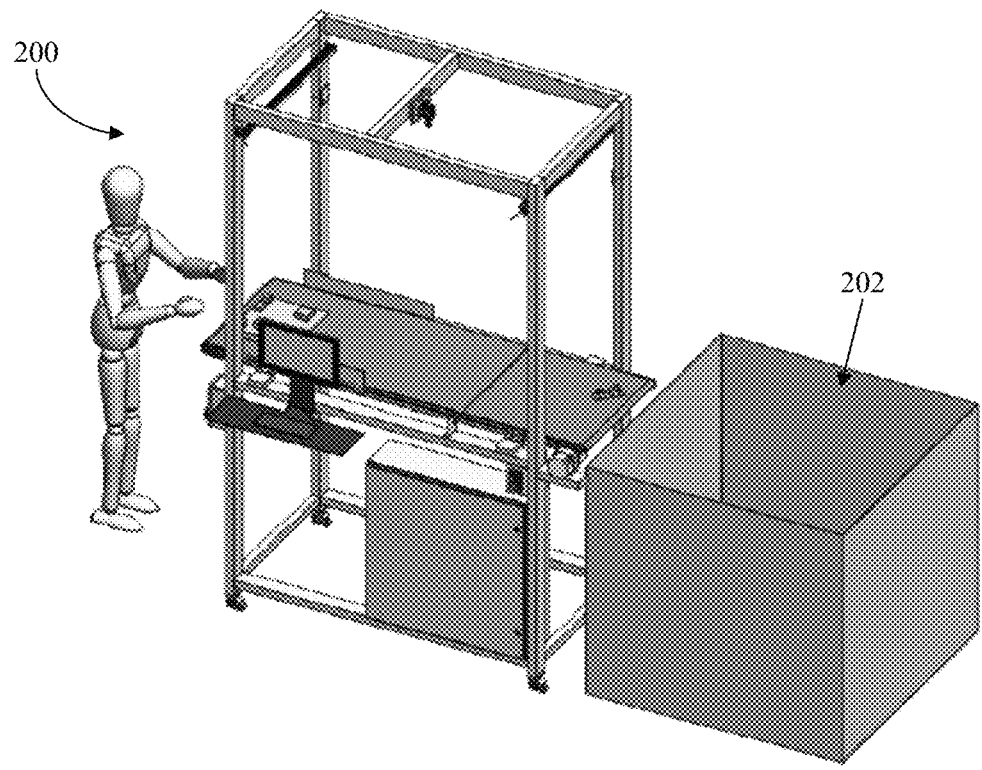
FIG. 2 shows a first view of a sorting station.
Figure 3:
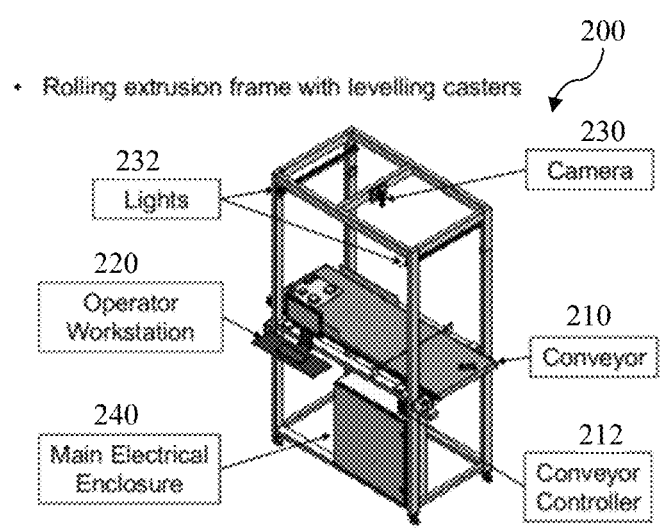
FIG. 3 shows another view of the sorting station.

FIGS. 2-3 illustrate a scanning station 200 for sorting circuit boards, comprising a conveyor belt 210, an operator station 220, and a camera 230 for scanning the circuit board. Preferably, the circuit board is placed flat on the conveyor 210 so that the camera 230, position above the conveyor belt 210, can capture an image of the circuit board and send the image to a computer in which the circuit board database is stored for the comparison and matching steps of the process.

As shown, the scanning station 200 is a rolling extrusion frame with levelling casters. The frame includes lights 232 which help illuminate the conveyor 210. The frame also houses a main electrical enclosure 240 which can serve to provide electricity to the various components. A conveyor controller 212 may be used to control the conveyor 210. The conveyor controller 212 can move the conveyor 210 in order to advance boards (for example, to move them in to a box 202) and/or to position the boards for scanning by the camera 230.

The operator station 220 may include a computer system, such as one having a processor and memory. The computer system may operate various components of the scanning station 200, such as the camera 230 and conveyor 210. Additionally, the operator station 220 may include a database of circuit board layouts and/or may communicate with another computer (such as via the internet) in order to access the database of circuit board layouts. The computer system may also include a screen or other output device in order to provide instructions to an operator, for example, to confirm a board has been identified and/or request the board be flipped for further imaging.

Figure 4:
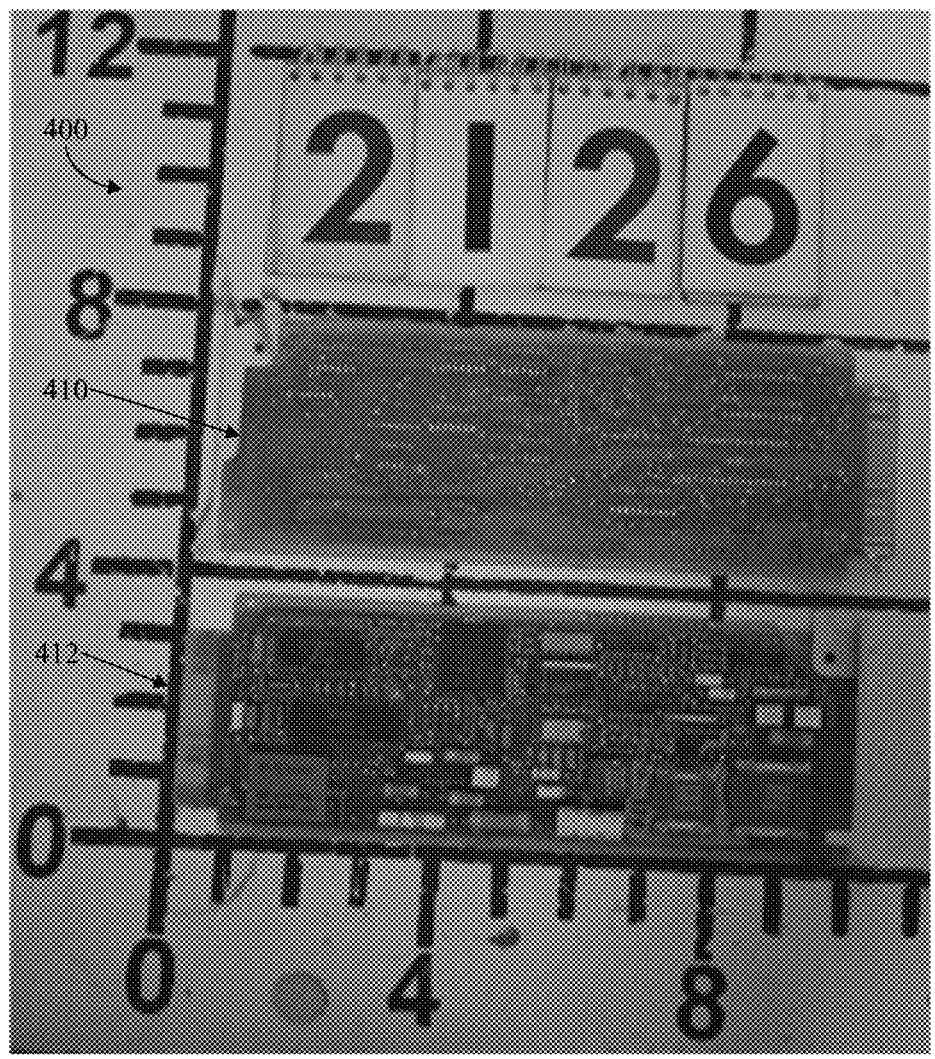
FIG. 4 illustrates a scan of a first circuit board.
Figure 5:
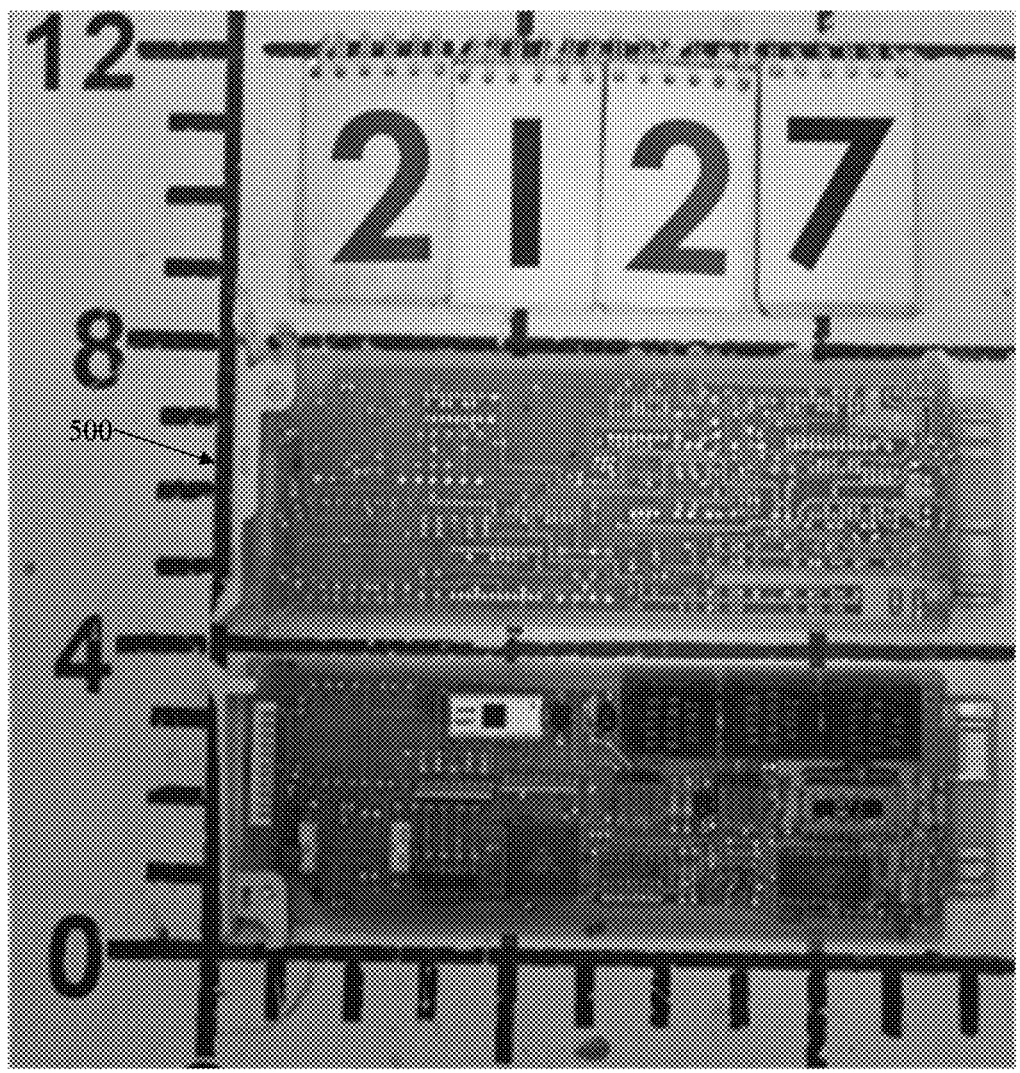
FIG. 5 illustrates a scan of another circuit board.
Figure 6:
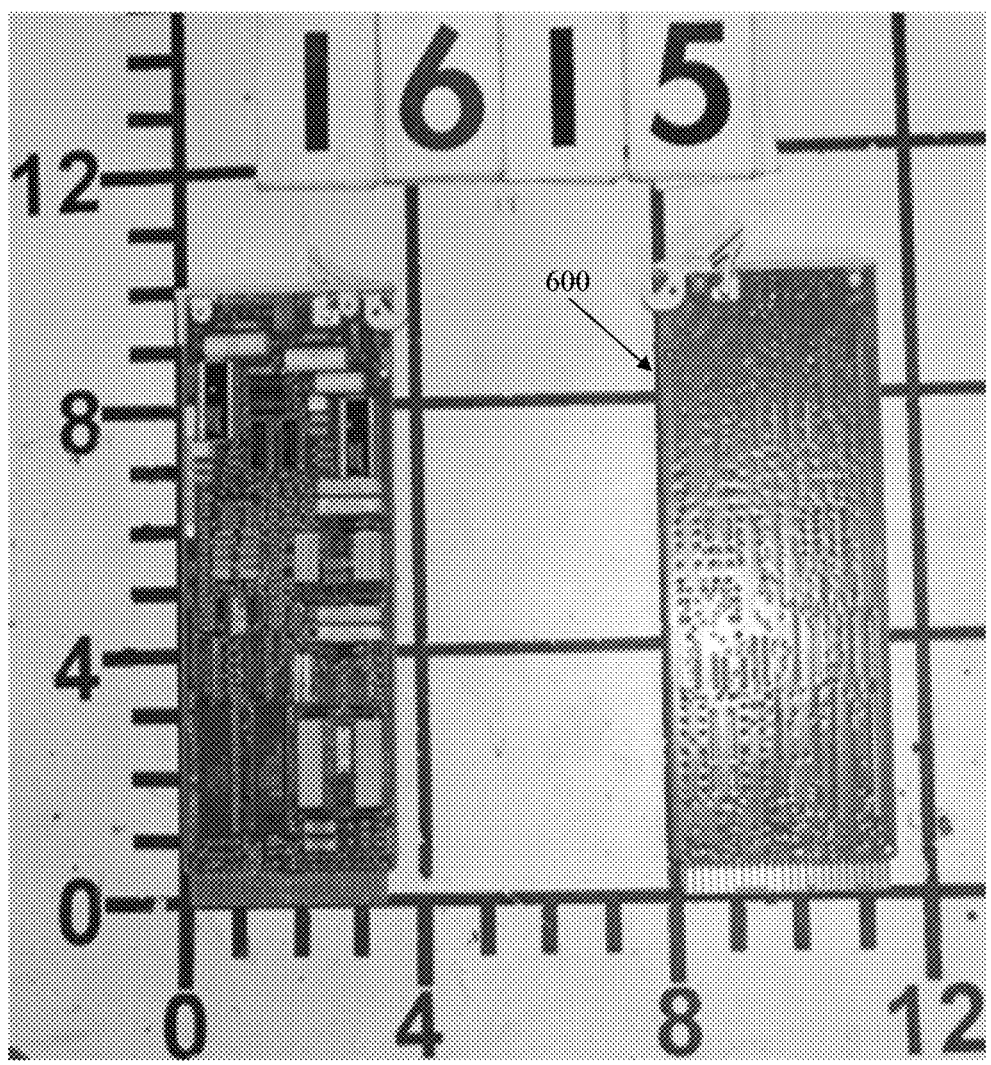
FIG. 6 illustrates a scan of a further circuit board.

Representative scans of circuit boards are illustrated in FIGS. 4-6, which show the general design, layout and size of circuit boards. FIG. 4 shows two sides 410, 412 of sample number 2126. The database of circuit board layouts may have listing of the following metal content: Au 10.08 Toz/MT, Ag 32.00 Toz/MT and Pd 3.57 Toz/MT. FIG. 5 shows a sample 500 with ID number 2127, which is listed as having: Au 13.62 Toz/MT, Ag 30.65 Toz/MT and Pd 8.77 Toz/MT and FIG. 6 shows sample 600 with ID number 1615, which is listed as having: Au 8.01 Toz/MT, Ag 42.56 Toz/MT and Pd 6.70 Toz/MT.

When a match is determined, the precious metal content of the board is known based upon information included in the database and associated with the matched design. This information is known based upon a prior assay of the board design, discussed further below. Once the system has information regarding each board being sorted based on the scan and comparison, the boards are sorted into one gaylord box for each category. In FIGS. 2-3, only one box 202 is illustrated; in operation, the conveyor belt 210 can be positioned near multiple such boxes and robotics (not shown) can move the circuit board to an appropriate box.

Still further, additional conveyor belts can be provided to route circuit boards further, allowing for an increased numbers of gaylord boxes to be used for sorting purposes. In operation, when a box that material is being sorted into becomes full, the system will move that box and replace it with an empty box. Typically, a gaylord box is 4'×4'×4' and these can be set alongside a long conveyor belt that will flip or place the boards into each box according to category once it is scanned and matched. Once the boards are sorted, they are then shredded and sold in troy ounces per metric ton.

Precious metal content for circuit boards is determined by a known fire assay process. For example, in accordance with the process of the present invention, after a scan of the board, the scan is compared with designs in the database for a match. If no close match is identified, the board is set aside for assaying. The assaying process involves the following steps:

1) A representative sample is taken of the board.
2) The sample is burned or ashed with a mixture of sulfur that makes all base metals brittle and easy to crush.
3) The sample is ground up and crushed to a 100-mesh powder making all precious metal in the sample homogeneous and equal in all parts.
4) A small sample is taken, and lead is added to sample to collect all precious metals when cooked at 1200 degrees for a period.
5) Lead is then cupelled in another oven that sucks all lead and base metals into the cupel leaving only a precious metal bead.
6) A bead is dissolved in acid separating gold from the silver, palladium.
7) Gold fleck is weighed on scale.
8) A dissolved silver and palladium sample is shot on the ICP (inductive coupled plasma) machine for pm content.
9) All information is entered into system and tied to a picture of the board with the gold, silver, and palladium content on it.
10) The board is now in the system for buyers to access when purchasing material off supplier's pictures.

The method and system of the present invention can also keep track of metal content as material is shipped out.

An automated system for sorting circuit boards can lead to labor reduction and, as a result, cost reduction, while increasing accuracy and profitability. For example, twelve sorters sorting a little over 500,000 pounds of high-grade boards each month cost around $0.10 per pound in sorting fees. The system of the present invention would reduce that cost by an estimated 75%.

An additional take-away from this system is that it creates a new way to purchase boards according to precious metal content, with fewer refining fees and processing fees. One can simply weigh the material (e.g., a full gaylord box) after it is sorted and enter the weights into an economic analysis. Because of the accuracy of the sorting process, there is certainty in the content amounts, and thus the precious metal amounts can be accurately and easily discerned.

The scanning process utilizes deep learning software, facial recognition and virtual image high resolution cameras to record and identify each circuit board in order to separate the board into its like category. The system can scan boards and record images of the board while the category is entered into the system using the information from the database. The process can use a single side scan, or scans of both sides for greater accuracy in comparison with the database. When identifying a board the system may use various techniques, for example, reading identification labels, comparing component positions, solder patterns, etc.

Once board images are recorded, they are added to the database, which is programmed into the sorting scanner, which is part of the sorting system. Boards are robotically dumped on a table and turned right side up and funneled through the sorting scanner. The image of each scanned board is compared with images in the database where matches can be made based on predesignated factors such as design, layout, size, and precious metal content. Once identified in the system, the board is conveyed and dumped into the gaylord box category it belongs to. Weight sensors may be under every gaylord box, when they are full, an automated forklift will take the box and put it to be staged for shredding.

If the scanner comes across a board that cannot be identified or matched to the database, the conveyor can dump the board into a marked gaylord box so that board can be sent to the lab to be fire assayed for precious metal content and then scanned into the database for future reference.

This present method and system will reduce labor costs and eliminate all human error, tightening the estimation versus final assay efficiency which will make anyone using the system extremely competitive.

Variations or next versions of the present invention can be used to identify certain processors that can be cut off the board, removed, and resold to be used again in a different board.

In yet another embodiment of the present invention, memory sticks and other components can be identified and tested for resale. The process can identify memory sticks by image scan, product code and/or chip set, and then determine which memory sticks or components to sort out for testing and resale. As with other embodiments described herein, this process will save a lot of time typically required for hand-sorting.

As described above, various embodiments provide a method, apparatus and computer program(s) to sorting circuit boards for recycling.

Figure 7:
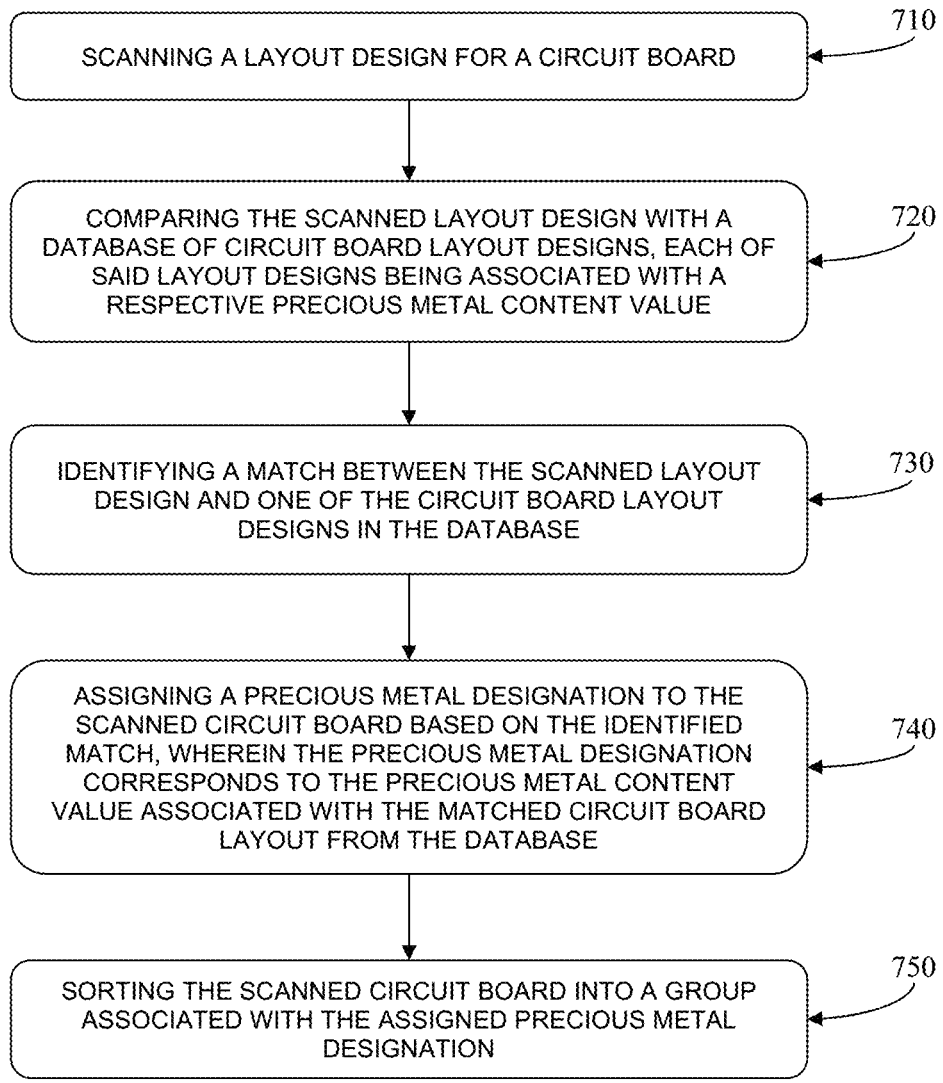
FIG. 7 is a logic flow diagram illustrating a method in accordance with an embodiment.

FIG. 7 is a logic flow diagram that illustrates a method, and a result of execution of computer program instructions, in accordance with various embodiments. In accordance with an embodiment a method performs, at Block 710, a step of scanning a layout design for a circuit board. The scanned layout design is compared, at Block 720, with a database of circuit board layout designs. Each layout design is associated with a respective precious metal content value. At Block 730, the method performs identifying a match between the scanned layout design and one of the circuit board layout designs in the database, and, at Block 740, the method also performs assigning a precious metal designation to the scanned circuit board based on the identified match. The precious metal designation corresponds to the precious metal content value associated with the matched circuit board layout from the database. At Block 750, the scanned circuit board is sorted into a group associated with the assigned precious metal designation.

The various blocks shown in FIG. 7 may be viewed as method steps, as operations that result from use of computer program code, and/or as one or more logic circuit elements constructed to carry out the associated function(s).

A first embodiment provides an automated method for sorting circuit boards for recycling. The method includes scanning a layout design for a circuit board and comparing the scanned layout design with a database of circuit board layout designs. Each of the layout designs being associated with a respective precious metal content value. A match between the scanned layout design and one of the circuit board layout designs in the database is identified. The method then assigns a precious metal designation to the scanned circuit board based on the identified match. The precious metal designation corresponds to the precious metal content value associated with the matched circuit board layout from the database. The method also includes sorting the scanned circuit board into a group associated with the assigned precious metal designation.

In a further embodiment of the method above, the match is identified based on one or more factors assigned to the circuit board layout design in the database. The factors can include the layout, size, composition, and/or precious metal content of the circuit board.

In another embodiment of any one of the methods above, the method also includes determining if there is no match between the scanned layout design and the circuit board layout designs in the database, and if no match is identified: assaying the scanned circuit board to determine a precious metal content value; and adding the scanned layout design for the scanned circuit board to the database.

In a further embodiment of any one of the methods above, sorting the scanned circuit board into the group associated with the assigned precious metal designation includes moving the circuit board into a box associated with the group. The circuit board may be moved into the box using: a conveyor belt and/or robotics.

In another embodiment of any one of the methods above, scanning the layout design for a circuit board includes: scanning a first side of the circuit board; flipping the circuit board over; and scanning a second side of the circuit board.

In a further embodiment of any one of the methods above, the precious metal content value indicates content in the circuit board of: gold, silver, palladium and/or base metal copper.

In another embodiment of any one of the methods above, sorting the scanned circuit board into a group may be further based on at least one of: design, size, weight, and composition.

A further embodiment provides an automated device for sorting circuit boards for recycling. The automated device includes at least one camera configured to scan layout designs of circuit boards and at least one conveyer configured to move the circuit boards. The automated device may also include a processor; and a memory storing computer program code. The memory and the computer program code configured to, with the processor, cause the automated device to scan, using the camera, a layout design for a circuit board; to compare the scanned layout design with a database of circuit board layout designs, each of the layout designs being associated with a respective precious metal content value; and to determine whether a match between the scanned layout design and one of the circuit board layout designs in the database exist. In response to identifying a match, the automated device assigns a precious metal designation to the scanned circuit board based on the identified match. The precious metal designation corresponds to the precious metal content value associated with the matched circuit board layout from the database. The automated device also sorts the scanned circuit board into a group associated with the assigned precious metal designation; and moves, using the conveyor, the scanned circuit board into a location assigned to the group.

In another embodiment of the automated device above, the match is identified based on at least one factor assigned to the circuit board layout design in the database. The at least one factor includes one of the layout, size, composition, or precious metal content of the circuit board.

In a further embodiment of any one of the automated devices above, the at least one memory and the computer program code are further configured to cause the automated device, in response to determining no match exists between the scanned layout design and the circuit board layout designs in the database: moving, using the conveyor, the scanned circuit board into a location for assaying the scanned circuit board to determine a precious metal content value; and adding the scanned layout design for the scanned circuit board to the database.

In another embodiment of any one of the automated devices above, moving the scanned circuit board into the location assigned to the group includes moving, using the conveyor, the circuit board into a box associated with the group. The conveyor can include at least one of: a conveyor belt and robotics.

In a further embodiment of any one of the automated devices above, scanning the layout design for a circuit board includes: scanning a first side of the circuit board; and scanning a second side of the circuit board.

In another embodiment of any one of the automated devices above, the precious metal content value indicates content in the circuit board of at least one of: gold, silver, palladium and base metal copper.

In a further embodiment of any one of the automated devices above, sorting the scanned circuit board into a group may be further based on at least one of: design, size, weight, and composition.

In another embodiment of any one of the automated devices above, the automated device also includes a storage device configured to store the database of circuit board layout designs.

The foregoing description of embodiments has been presented for the purpose of illustration and description. It is not intended to be exhaustive or to limit the invention to the form disclosed. Obvious modifications and variations are possible in light of the above disclosure. Furthermore, various features of the described embodiments may be used without the corresponding use of other features. The embodiments described were chosen to best illustrate the principles of the invention and practical applications thereof to enable one of ordinary skill in the art to utilize the invention in various embodiments and with various modifications as suited to the particular use contemplated.

What is claimed is:

1. An automated method for sorting circuit boards for recycling, comprising:
scanning a layout design for a circuit board to generate an image;
comparing the scanned layout design with a database of circuit board layout designs, each of the layout designs being associated with a respective precious metal content value, the precious metal content value indicating an amount of a precious metal in a circuit board layout design;

identifying a match between the scanned layout design and a matched circuit board layout design in the database based on one or more of design, layout, size, and precious metal content;

assigning a precious metal designation to the scanned circuit board based on the identified match, wherein the precious metal designation corresponds to the precious metal content value of the matched circuit board layout design from the database; and sorting the scanned circuit board using the assigned precious metal designation.

2. The method according to claim 1, wherein the match is further identified based on at least one factor assigned to the circuit board layout design in the database.

3. The method according to claim 2, wherein the at least one factor comprises one of composition, or precious metal content of the circuit board.

4. The method according to claim 1, further comprising the step of determining if there is no match between the scanned layout design and the circuit board layout designs in the database, and if no match is identified:
assaying the scanned circuit board to determine the precious metal content value; and
adding the scanned layout design for the scanned circuit board to the database.

5. The method according to claim 1, wherein sorting the scanned circuit board into a group associated with the assigned precious metal designation comprises moving the circuit board into a box associated with the group.

6. The method according to claim 5, wherein the circuit board is moved into the box using at least one of: a conveyor belt and robotics.

7. The method according to claim 1, wherein scanning the layout design for the circuit board comprises:
scanning a first side of the circuit board;
flipping the circuit board over; and
scanning a second side of the circuit board.

8. The method according to claim 1, wherein the precious metal content value indicates content in the circuit board of at least one of: gold, silver, palladium and base metal copper.

9. The method according to claim 1, wherein sorting the scanned circuit board may be further based on at least one of: design, size, weight, and composition.

10. An automated device for sorting circuit boards for recycling, comprising:
at least one camera configured to scan layout designs of circuit boards;
at least one conveyer configured to move the circuit boards; and
at least one processor; and at least one memory including computer program code, the at least one memory and the computer program code configured to, with the at least one processor, cause the automated device to perform at least the following:
to scan, using the camera, a layout design for a circuit board generating an image;
to compare the scanned layout design with a database of circuit board layout designs, each of the layout designs being associated with a respective precious metal content value, the precious metal content value indicating an amount of a precious metal in a circuit board layout design;
to determine whether a match between the scanned layout design and a matched circuit board layout from the circuit board layout designs in the database exist based on one or more of design, layout, size, and precious metal content;

in response to identifying a match, to assign a precious metal designation to the scanned circuit board based on the identified match, wherein the precious metal designation corresponds to the precious metal content value of the matched circuit board layout design from the database;

to sort the scanned circuit board using the assigned precious metal designation; and to move, using at least one conveyor, the scanned circuit board into a location assigned to a group associated with the assigned precious metal designation.

11. The automated device according to claim 10, wherein the match is further identified based on at least one factor assigned to the circuit board layout design in the database.

12. The automated device according to claim 11, wherein the at least one factor comprises one of composition, or precious metal content of the circuit board.

13. The automated device according to claim 10, wherein the at least one memory and the computer program code are further configured to cause the automated device, in response to determining no match exists between the scanned layout design and the circuit board layout designs in the database:
moving, using the at least one conveyor, the scanned circuit board into a location for assaying the scanned circuit board to determine the precious metal content value; and
adding the scanned layout design for the scanned circuit board to the database.

14. The automated device according to claim 10, wherein moving the scanned circuit board into the location assigned to the group comprises moving, using the at least one conveyor, the circuit board into a box associated with the group.

15. The automated device according to claim 14, wherein the at least one conveyor comprises at least one of: a conveyor belt and robotics.

16. The automated device according to claim 10, wherein scanning the layout design for a circuit board comprises:
scanning a first side of the circuit board; and
scanning a second side of the circuit board.

17. The automated device according to claim 10, wherein the precious metal content value indicates content in the circuit board of at least one of: gold, silver, palladium and base metal copper.

18. The automated device according to claim 10, wherein sorting the scanned circuit board may be further based on at least one of: design, size, weight, and composition.

19. The method according to claim 1, wherein scanning the layout design for the circuit board comprises:
scanning a first side of the circuit board;
determining whether the match between the image of the first side and an image of a matched circuit board can be made; and
in response to determining that the match between the image of the first side and an image of a matched circuit board cannot be made, sending a request that the circuit board be flipped over and a second side of the circuit board scanned.

20. An automated method for sorting circuit boards for recycling, comprising:
scanning a first layout design for a first circuit board to generate an image of the first layout design;

comparing the first layout design with a database of circuit board layout designs, each of the layout designs being associated with a respective precious metal content value, the precious metal content value indicating an amount of a precious metal in a circuit board layout design;

determining whether a match between the first layout design and a matched circuit board design is located in the database based on one or more of design, layout, size, and precious metal content;

in response to determining that no match is located in the database, assaying the circuit board to determine an assayed precious metal content value;

adding the first layout design to the database, the first layout design associated with the assayed precious metal content value;

scanning a second layout design for a second circuit board to generate an image of the second layout design, wherein the second layout design matches the first layout design;

comparing the image of the second layout design with the database of images of circuit board layout designs;

determining that a match exists between the second layout design and first layout design located in the database, using, at least in part, image recognition processes configured to compare the sizes, layouts and component positions of the circuit boards;

assigning the assayed precious metal designation to the second circuit board based on the match; and sorting the second circuit board using the assayed precious metal designation.

* * * * *